(12) United States Patent
Blaney et al.

(10) Patent No.: US 11,668,197 B2
(45) Date of Patent: Jun. 6, 2023

(54) INTERNALLY DAMPED AIRFOILED COMPONENT

(71) Applicant: Raytheon Technologies Corporation, Farmington, CT (US)

(72) Inventors: Ken F. Blaney, Middleton, NH (US); Richard K. Hayford, Cape Neddick, ME (US)

(73) Assignee: Raytheon Technologies Corporation, Farmington, CT (US)

(*) Notice: Subject to any disclaimer, the term of this patent is extended or adjusted under 35 U.S.C. 154(b) by 300 days.

(21) Appl. No.: 16/879,274

(22) Filed: May 20, 2020

(65) Prior Publication Data

US 2020/0284152 A1   Sep. 10, 2020

Related U.S. Application Data

(62) Division of application No. 14/785,119, filed as application No. PCT/US2014/034933 on Apr. 22, 2014, now Pat. No. 10,697,303.

(Continued)

(51) Int. Cl.
*F01D 5/16* (2006.01)
*B22F 5/04* (2006.01)
(Continued)

(52) U.S. Cl.
CPC .............. *F01D 5/16* (2013.01); *B22F 5/04* (2013.01); *B22F 10/28* (2021.01);
(Continued)

(58) Field of Classification Search
CPC .............. F01D 5/18; F01D 5/16; F01D 25/06; F05D 2260/96
See application file for complete search history.

(56) References Cited

U.S. PATENT DOCUMENTS 2,828,941 A   4/1958   Foley
4,441,859 A   4/1984   Sadler
(Continued)

FOREIGN PATENT DOCUMENTS

EP   0573928 A1   12/1993
EP   0757160 A2   2/1997
(Continued)

OTHER PUBLICATIONS

International Search Report and Written Opinion from PCT Application Serial No. PCT/US2014/034933, dated Aug. 22, 2014, 11 pages.

(Continued)

*Primary Examiner* — Courtney D Heinle
*Assistant Examiner* — John S Hunter, Jr.
(74) *Attorney, Agent, or Firm* — Kinney & Lange, P.A.

(57) ABSTRACT

An airfoiled component comprises: a root section, an airfoil section, a damper pocket enclosed within a portion of the airfoil section, and a damper. The airfoil section includes a suction sidewall and a pressure sidewall each extending chordwise between a leading edge and a trailing edge, and extending spanwise between the root section and an airfoil tip. The damper includes a fixed end unified with a damper mounting surface, and a free end extending into the damper pocket from the damper mounting surface.

9 Claims, 7 Drawing Sheets

Related U.S. Application Data

(60) Provisional application No. 61/815,095, filed on Apr. 23, 2013.

(51) Int. Cl.

| | | |
|---|---|---|
| *F04D 29/66* | (2006.01) | |
| *B22F 10/28* | (2021.01) | |
| *B23K 26/342* | (2014.01) | |
| *B23K 15/00* | (2006.01) | |
| *F01D 5/18* | (2006.01) | |
| *F01D 9/04* | (2006.01) | |
| *F01D 25/06* | (2006.01) | |
| *F01D 25/12* | (2006.01) | |
| *F04D 29/32* | (2006.01) | |
| *F04D 29/54* | (2006.01) | |
| *B22F 10/25* | (2021.01) | |

(52) U.S. Cl.
CPC ........ *B23K 15/0086* (2013.01); *B23K 26/342* (2015.10); *F01D 5/18* (2013.01); *F01D 9/041* (2013.01); *F01D 25/06* (2013.01); *F01D 25/12* (2013.01); *F04D 29/324* (2013.01); *F04D 29/542* (2013.01); *F04D 29/668* (2013.01); *B22F 10/25* (2021.01); *F05D 2220/30* (2013.01); *F05D 2220/36* (2013.01); *F05D 2230/22* (2013.01); *F05D 2230/30* (2013.01); *F05D 2230/31* (2013.01); *F05D 2260/96* (2013.01); *Y02P 10/25* (2015.11)

(56) References Cited

U.S. PATENT DOCUMENTS

| | | | |
|---|---|---|---|
| 5,165,860 A | | 11/1992 | Stoner et al. |
| 5,232,344 A | | 8/1993 | El-Aini |
| 5,558,497 A | | 9/1996 | Kraft et al. |
| 5,718,951 A | | 2/1998 | Sterett et al. |
| 5,820,343 A | | 10/1998 | Kraft et al. |
| 6,095,755 A | * | 8/2000 | Houston ............ C23C 4/01 416/224 |
| 6,709,771 B2 | | 3/2004 | Allister |
| 6,823,707 B2 | | 11/2004 | Andras et al. |
| 7,300,256 B2 | | 11/2007 | Masserey et al. |
| 7,358,457 B2 | | 4/2008 | Peng et al. |
| 7,690,112 B2 | | 4/2010 | Bostanjoglo et al. |
| 7,810,237 B2 | | 10/2010 | Lange et al. |
| 7,824,158 B2 | | 11/2010 | Bauer et al. |
| 7,905,016 B2 | | 3/2011 | James et al. |
| 7,966,707 B2 | | 6/2011 | Szela et al. |
| 7,984,547 B2 | | 7/2011 | Steinhardt |
| 8,006,380 B2 | | 8/2011 | Rawson et al. |
| 8,240,046 B2 | | 8/2012 | Peretti et al. |
| 8,267,662 B2 | | 9/2012 | Patrick et al. |
| 2002/0152715 A1 | | 10/2002 | Rotheroe |
| 2005/0135933 A1 | | 6/2005 | Gregg et al. |
| 2006/0081571 A1 | | 4/2006 | Hoebel et al. |
| 2007/0081894 A1 | | 4/2007 | Gamem |
| 2013/0280045 A1 | | 10/2013 | Dolansky et al. |
| 2015/0258609 A1 | | 9/2015 | Teulet |

FOREIGN PATENT DOCUMENTS

| | | |
|---|---|---|
| EP | 2009240 | 12/2008 |
| GB | 2405186 A | 2/2005 |
| JP | S5546042 A | 3/1980 |
| JP | S5647601 A | 4/1981 |
| WO | WO2011019412 A2 | 2/2011 |
| WO | WO2013163047 A1 | 10/2013 |
| WO | WO2013163049 A1 | 10/2013 |

OTHER PUBLICATIONS

Extended European Search Report, for European Patent Application No. 14787110, dated Nov. 8, 2016, 12 pages.

* cited by examiner

INTERNALLY DAMPED AIRFOILED COMPONENT

CROSS-REFERENCE TO RELATED APPLICATION(S)

This application is a divisional of U.S. application Ser. No. 14/785,119 filed Oct. 16, 2015 for "INTERNALLY DAMPED AIRFOILED COMPONENT AND METHOD" by K. Brown and R. Hayford, which is a § 371 of PCT Application No. PCT/US2014/034933 filed Apr. 22, 2014 for "INTERNALLY DAMPED AIRFOILED COMPONENT AND METHOD" by K. Brown and R. Hayford, which claims the benefit of U.S. Provisional Application No. 61/815,095 filed Apr. 23, 2013 for "INTERNALLY DAMPED AIRFOILED COMPONENT AND METHOD" by K. Brown and R. Hayford.

BACKGROUND

The described subject matter relates generally to gas turbine airfoils, and more specifically to internally damped gas turbine airfoils.

External and internal dampers have been added to rotor blades to reduce or alter vibrational modes. Some internal dampers currently require that the two (suction and pressure) sides of the airfoil be formed separately and bonded together around the damper. In such cases, the internal damper is not bonded to any of the internal blade walls or ribs Other internal dampers are inserted from the exterior of the blade and therefore must be adapted so as not to interfere with the airfoil surface.

SUMMARY

An airfoiled component comprises: a root section, an airfoil section, a damper pocket enclosed within a portion of the airfoil section, and a damper. The airfoil section includes a suction sidewall and a pressure sidewall each extending chordwise between a leading edge and a trailing edge, and extending spanwise between the root section and an airfoil tip. The damper includes a fixed end unified with a damper mounting surface, and a free end extending into the damper pocket from the damper mounting surface.

A method of making an airfoiled component for a turbine engine comprises providing a first plurality of metal powder particles. An energy beam is selectively directed over the first plurality of metal powder particles to form a first molten powder pool. At least a portion of the first molten powder pool is solidified to form a component wall build layer on a first deposition surface. A second plurality of metal powder particles is provided. An energy beam is directed selectively over the second plurality of metal powder particles to form a second molten powder pool. At least a portion of the second molten powder pool to form a damper build layer on a second deposition surface.

DETAILED DESCRIPTION

Figure 1:
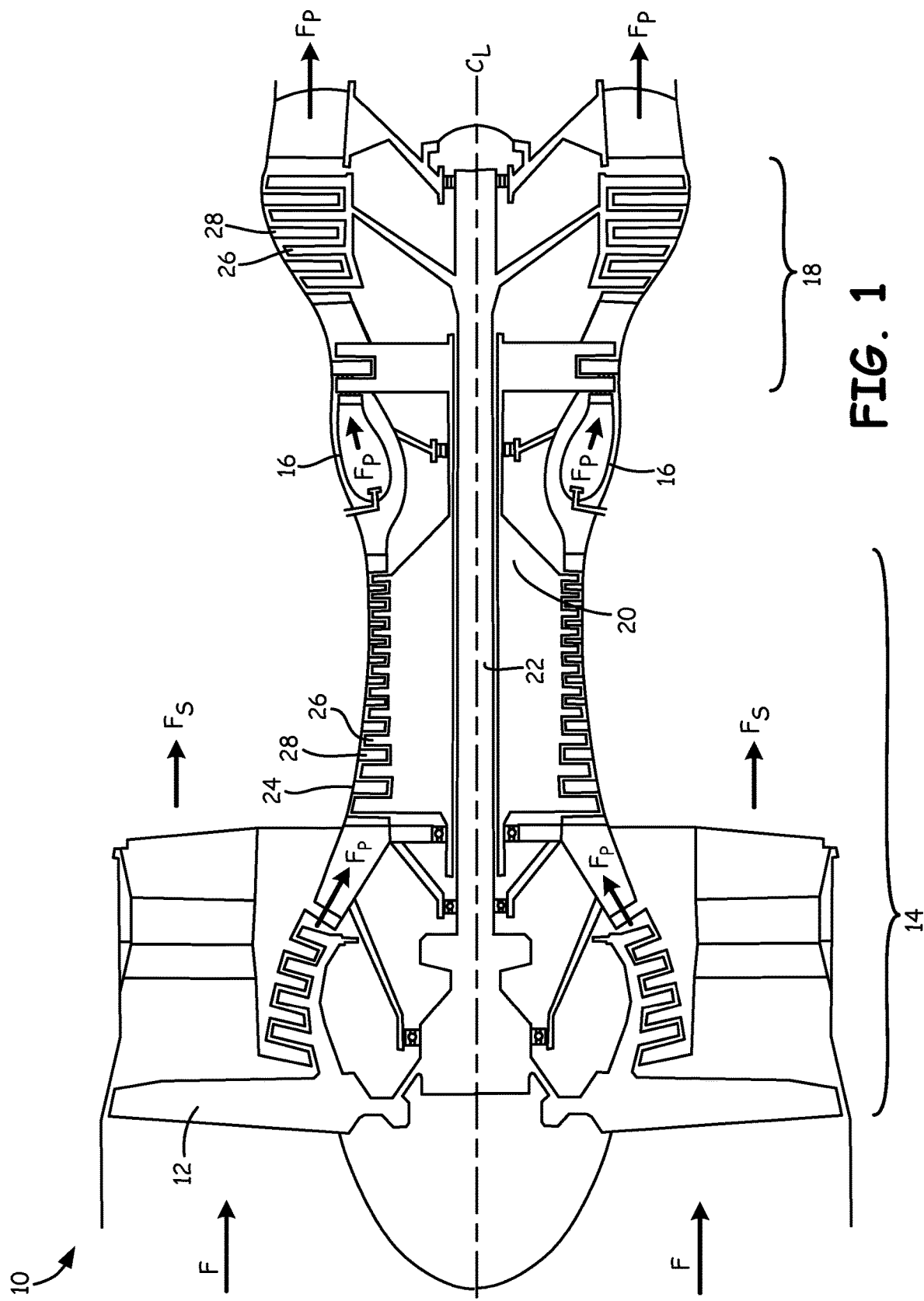
FIG. 1 schematically depicts an example turbofan engine.

FIG. 1 is a representative illustration of a gas turbine engine 10 including a liner/vane assembly of the present invention. The view in FIG. 1 is a longitudinal sectional view along an engine center line. FIG. 1 shows gas turbine engine 10 including fan blade 12, compressor 14, combustor 16, turbine 18, high-pressure rotor 20, low-pressure rotor 22, and engine casing 24. Compressor 14 and turbine 18 include rotor stages 26 and stator stages 28.

As illustrated in FIG. 1, fan blade 12 extends from engine center line CL near a forward end of gas turbine engine 10. Compressor 14 is disposed aft of fan blade 12 along engine center line CL, followed by combustor 16. Turbine 18 is located adjacent combustor 16, opposite compressor 14. High-pressure rotor 20 and low-pressure rotor 22 are mounted for rotation about engine center line CL. High-pressure rotor 20 connects a high-pressure section of turbine 18 to compressor 14. Low-pressure rotor 22 connects a low-pressure section of turbine 18 to fan blade 12 and a high-pressure section of compressor 14. Rotor stages 26 and stator stages 28 are arranged throughout compressor 14 and turbine 18 in alternating rows. Thus, rotor stages 26 connect to high-pressure rotor 20 and low-pressure rotor 22. Engine casing 24 surrounds turbine engine 10 providing structural support for compressor 14, combustor 16, and turbine 18, as well as containment for air flow through engine 10.

In operation, air flow F enters compressor 14 after passing between fan blades 12. Air flow F is compressed by the rotation of compressor 14 driven by high-pressure turbine 18. The compressed air from compressor 14 is divided, with a portion going to combustor 16, a portion bypasses through fan 12, and a portion employed for cooling components, buffering, and other purposes. Compressed air and fuel are mixed and ignited in combustor 16 to produce high-temperature, high-pressure combustion gases Fp. Combustion gases Fp exit combustor 16 into turbine section 18.

Stator stages 28 properly align the flow of air flow F and combustion gases Fp for an efficient attack angle on subsequent rotor stages 26. The flow of combustion gases Fp past rotor stages 26 drives rotation of both low-pressure rotor 20 and high-pressure rotor 22. High-pressure rotor 20 drives a high-pressure portion of compressor 14, as noted above, and low-pressure rotor 22 drives fan blades 12 directly or through a gear reduction device (not shown) to produce thrust Fs from gas turbine engine 10.

Figure 2A:
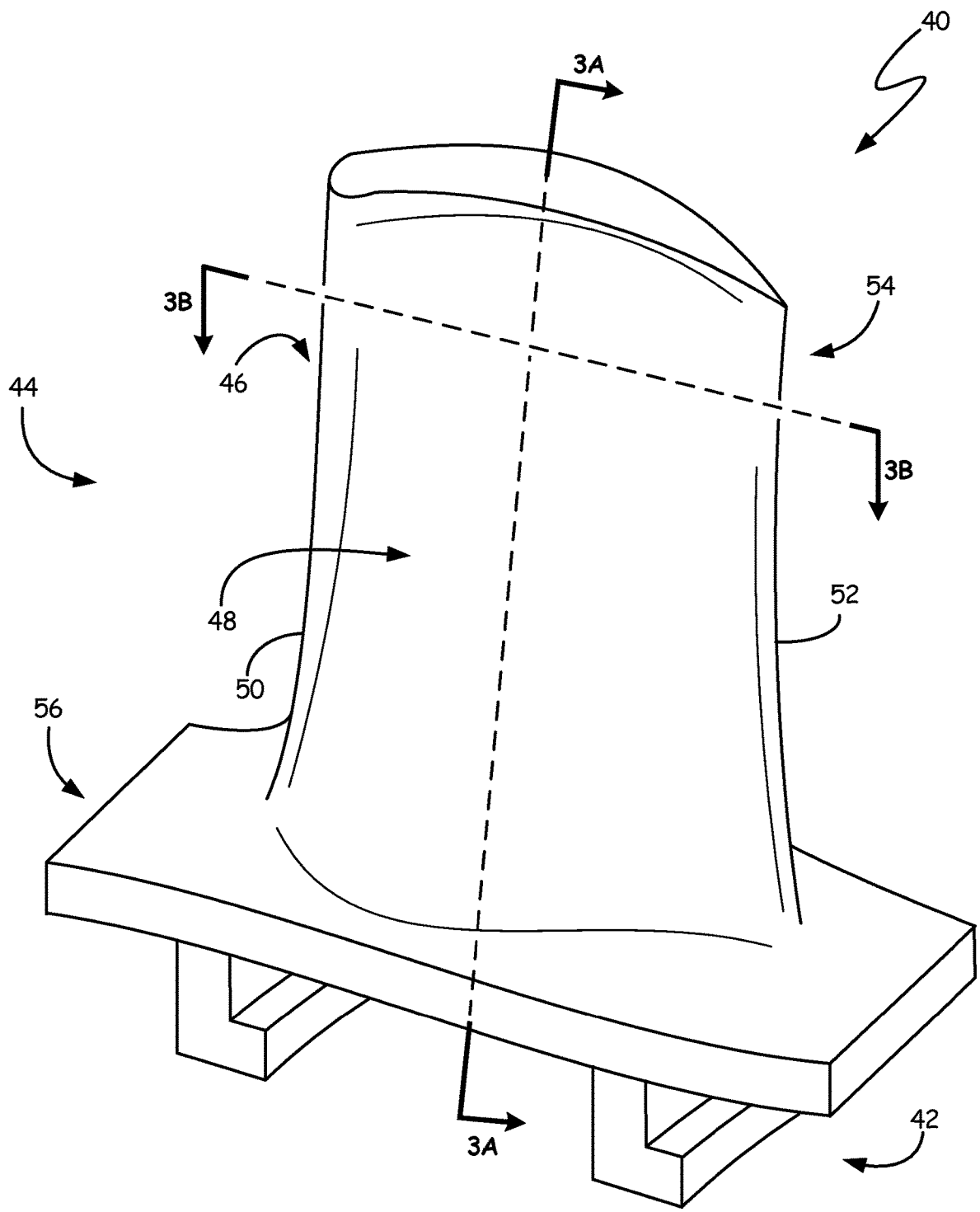
FIG. 2A shows an internally damped airfoiled component for the example turbofan engine.

FIG. 2A shows airfoiled component 40 for turbine engine 10. FIG. 2A also includes root section 42, airfoil section 44, suction sidewall 46, pressure sidewall 48, leading edge 50, trailing edge 52, airfoil tip 54, and platform 56.

Airfoiled component 40 is described as a vane or rotor blade suitable for use in gas turbine engine 10 shown in FIG. 1. However, various embodiments of airfoiled component 40 can additionally and/or alternatively be configured for installation into one or more locations in example gas turbine engine 10, including fan blades 12, compressor 14, and/or turbine 18. Airfoiled component 40 is also suitable for use as a blade or vane in other embodiments of gas and steam turbine engines.

In the example embodiment of FIG. 2A, airfoiled component 40 is shown as a cantilevered vane which includes root section 42 joined to airfoil section 44. Airfoil section 44 can include suction sidewall 46 and pressure sidewall 48 each extending chordwise between leading edge 50 and trailing edge 52. Suction sidewall 46 and pressure sidewall 48 each extend spanwise between root section 42, and airfoil tip 54. Airfoiled component 40 also includes platform 56 proximate the intersection of root section 42 and airfoil section 44. Root section 42 can optionally include one or more coolant inlet passages (not shown).

As a cantilevered vane, airfoiled component 40 has a standard airfoil tip 54 adapted to contact and form a seal with a rotating element such as a turbine rotor. However, depending on properties of airfoiled component 40, airfoil tip 54 can alternatively include one or more attachment and flow conditioning features such as a second platform and/or root. Other embodiments of airfoiled component 40 include shrouded or unshrouded rotor blades with suitable features in place of root section 42 and/or airfoil tip 54. Unshrouded blades can have tip features such as a tip shelf, tip recess, and/or squealer rib (not shown).

Figure 2B:
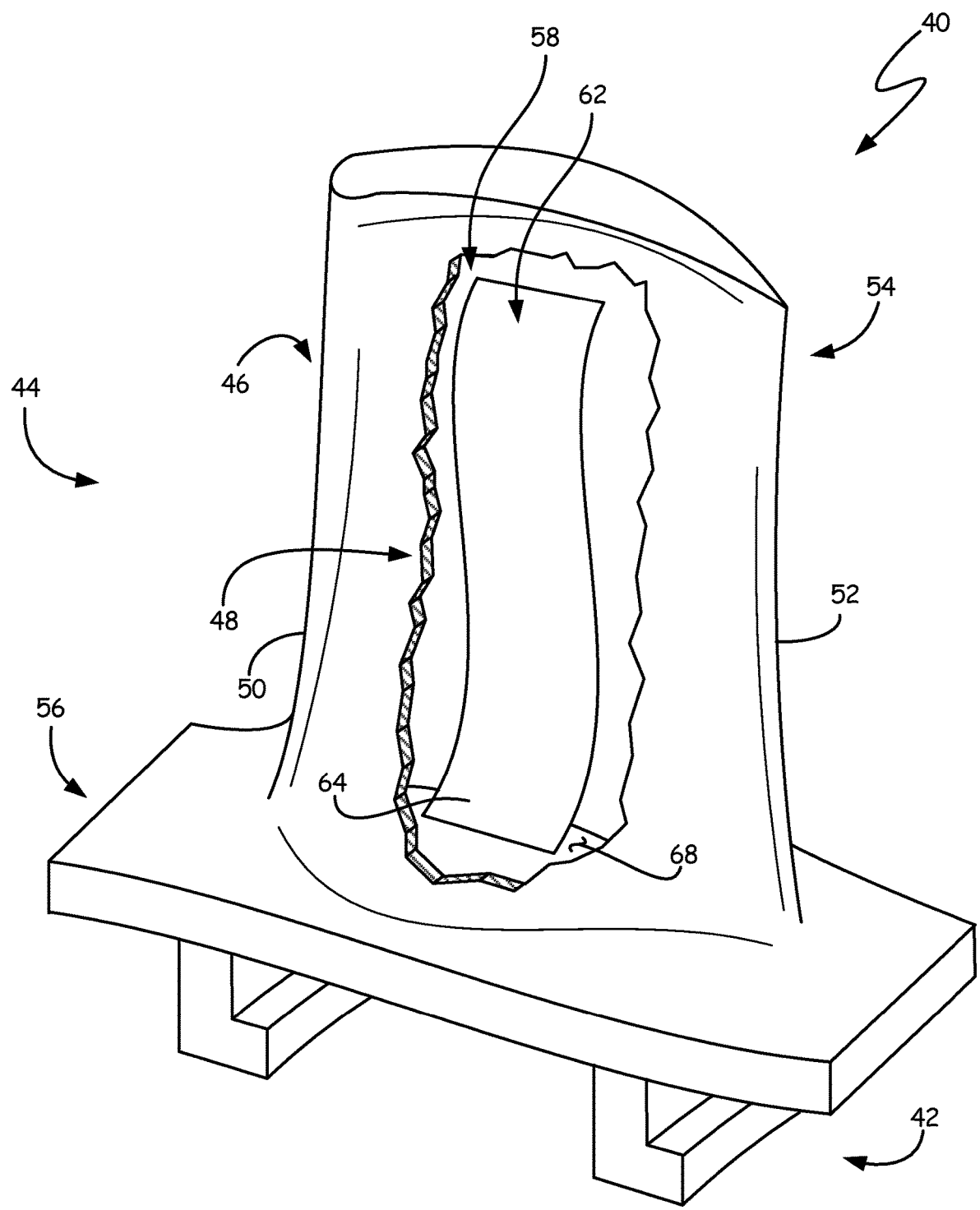
FIG. 2B is a cutaway view showing the airfoiled component with an internal damper.

FIG. 2B shows airfoiled component 40 with a portion of pressure sidewall 48 and platform 56 cut away to show damper pocket 58 and damper 62. FIG. 2B also includes root section 42, airfoil section 44, suction sidewall 46, leading edge 50, trailing edge 52, airfoil tip 54, damper pocket 58, damper 62, damper fixed end 64, damper free end 66, and damper mounting surface 68.

Damper 62 extends spanwise along damper pocket 58, disposed on an interior portion of airfoil section 44. Damper 62 can include fixed end 64 metallurgically bonded to a surface of damper pocket 58. Damper free end 66, extending generally toward airfoil tip 54, is able to move within damper cavity 58 and contact one or more damper cavity surfaces, thereby dissipating vibratory energy by friction and reducing the likelihood of large vibratory response in different operational modes. Vibration can be caused at least in part by working gas flow(s) F, Fp, and/or Fs (shown in FIG. 1) flowing over airfoil section 44. Thus at least airfoil section 44 and damper 62 can have a unitary construction where both are fabricated using an additive manufacturing process, such as a powder bed deposition process. Using this process, damper fixed end 64 can be metallurgically bonded or unified with damper mounting surface 68 in damper pocket 58.

Figure 3A:
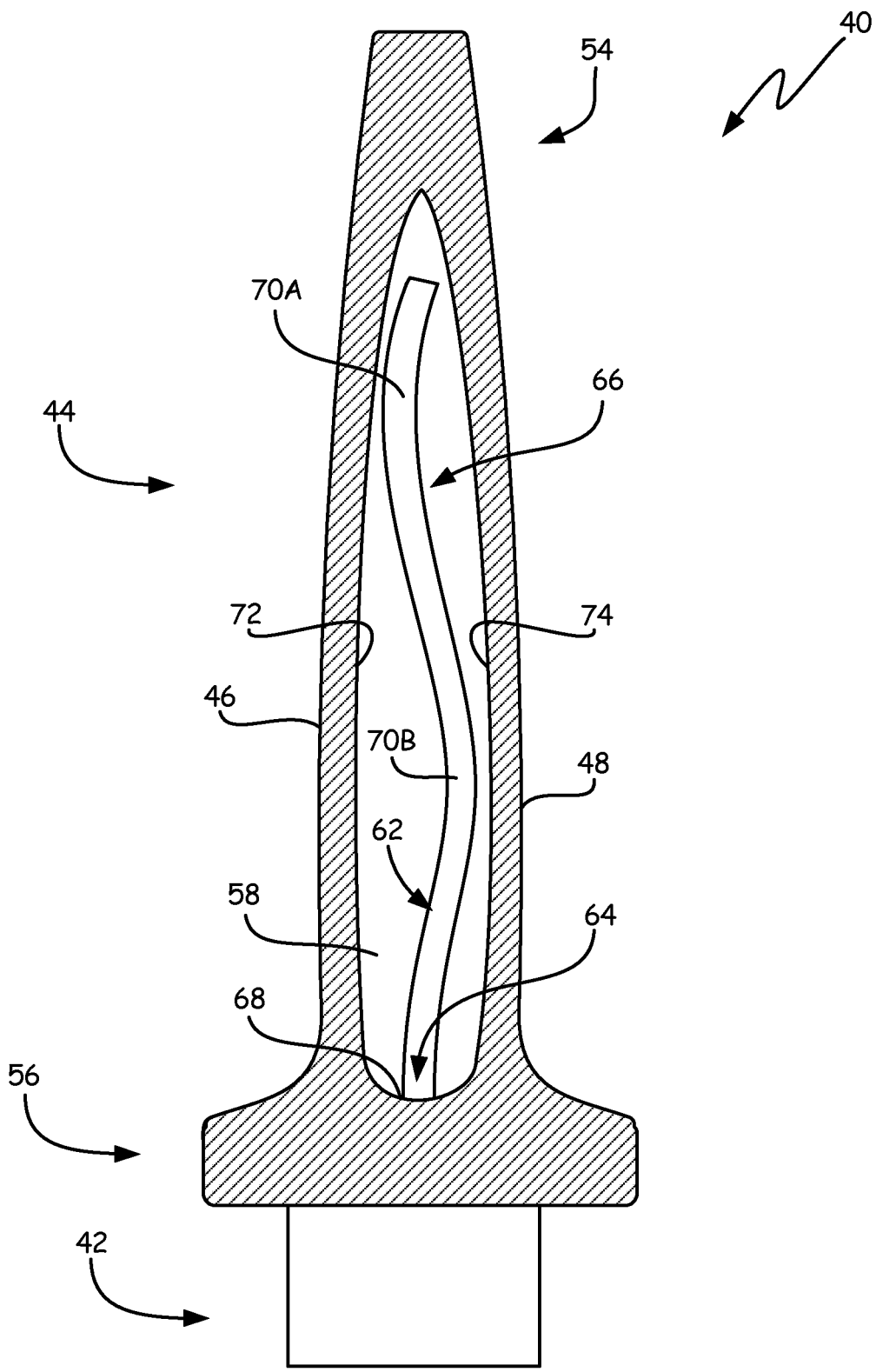
FIG. 3A is a first sectional view taken through the airfoiled component.
Figure 3B:
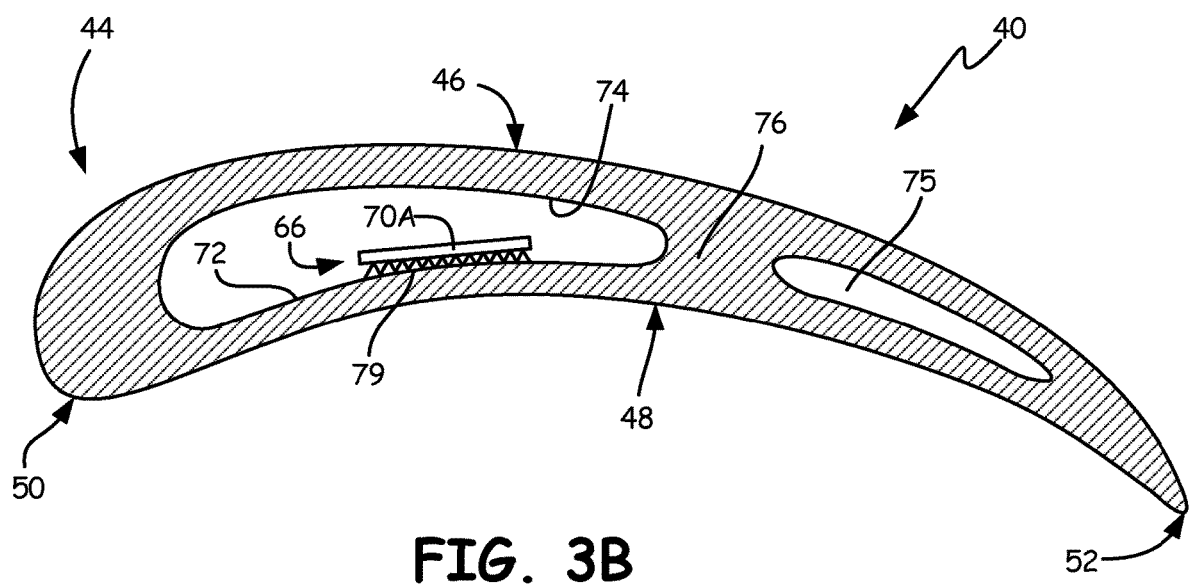
FIG. 3B is a second sectional view taken through the airfoiled component.

FIGS. 3A and 3B are sectional views of airfoiled component 40. FIG. 3A, taken across section line 3A-3A of FIG. 2A, shows a side view of airfoiled component 40 with damper pocket 58 and damper 62. FIG. 3B is taken across section line 3B-3B of FIG. 2A through airfoil section 44 and damper free end 66. FIGS. 3A and 3B also include root section 42, suction sidewall 46, pressure sidewall 48, airfoil tip 54, damper fixed end 64, damper mounting surface 68, curved damper portions 70A, 70B, suction side damper pocket surface 72, pressure side damper pocket surface 74, cooling cavity 75, rib 76, and temporary damper connection 77.

In the example of FIGS. 3A and 3B, damper pocket 58 and damper 62 can extend generally spanwise along airfoil section 44 to facilitate damping of airfoiled component 40. Additive manufacturing and unification of both damper 62 with a mounting surface of damper pocket 58 allows great flexibility in the formation, efficacy, and useful life of internal damped structures. Damper 62 can be configured in different ways to optimize damping for a particular set of operating conditions. During operation there is differential deflection of damper free end 66 relative to one or both airfoil sidewalls (i.e., suction sidewall 46 and/or pressure sidewall 48). In certain embodiments, such as stator vanes, relative deflection can occur due to airflow over airfoil sidewalls 46, 48 causing rotation or torquing of airfoil section 44 relative to root section 42. Since damper fixed end 64 can be metallurgically bonded to damper mounting surface 68 in damper pocket 58, the result is that at least one portion of damper free end 66 rests against corresponding damper pocket surfaces spaced apart from damper mounting surface 68. In the example vane of FIG. 3A, first curved damper portion 70A contacts a first, or suction side damper pocket surface 72, while second curved damper portion 70B contacts a second, or pressure side damper pocket surface 74. These and other damper arrangements have the effect of locally or globally changing vibrational modes of airfoil section 44, and in turn, vibrational modes of airfoiled component 40.

In an alternative example where airfoiled component 40 is configured as a rotor blade, deflection of airfoil sidewalls 46, 48 relative to damper can also occur due to rotation of airfoiled component 40 about engine center line CL (shown in FIG. 1). During rotation of component 40, the centrifugal forces on airfoil portion 44 and damper 62 cause free end 66 to trail fixed end 64. Simultaneously, centrifugal forces on free end 66 cause damper 62 to straighten, so that in use, at least one portion of free end 66 rests against one or more surfaces generally at the outer end of damper pocket 58.

In certain embodiments, airfoiled component 40 also includes trailing edge cooling cavity 75. FIG. 3B shows rib 76 separating cavity 75 from damper pocket 58. In certain of these embodiments cavity 75 is in fluid communication with damper pocket 58. Additionally or alternatively, damper pocket 58 can itself operate as a cooling cavity. In doing so, root section 42 and/or airfoil section 44 can include one or more coolant inlets and outlets (not shown).

At the time of additive manufacture or repair of airfoiled component 40, one or more portions of damper 62 can be temporarily secured to a surface of damper pocket 58. In FIG. 3B, first curved portion 70A of damper free end 66 is temporarily secured via a lightly sintered damper connection 77 to pressure side damper pocket surface 74. Damper connection 77 can be a localized, relatively weak metal structure such as spaced apart mini-ribs or honeycombs. This can be done during formation or repair of airfoiled component 40 by additive manufacturing (illustrative example shown in FIG. 4). By temporarily securing or sintering one or more portions of damper free end 66 during an additive manufacturing process, damper 62 can remain secure during transport and/or installation of unitary airfoil component 40.

Prior to or after installation of component 40 into a stator case, engine rotor, or other assembly (not shown), airfoil section 46 can be manipulated, heated, vibrated, or otherwise treated to break apart temporary damper connection 77, which separates free end 66 from the corresponding surface(s) of damper pocket 58. If airfoiled component 40 is configured as a rotor blade, the rotor can be operated in a break-in mode to break apart the one or more temporary damper connections 77. Operating of the rotor can be done either by balancing the rotor outside of the engine, or through a balancing sequence occurring after installation of the rotor into the engine. It will be appreciated that in certain embodiments, damper free end 66 can include multiple temporary damper connections localized in different areas of damper cavity 58 so as to help create and maintain more complex damper and cavity geometries during manufacture and/or repair of unitary airfoil component 40.

In other examples, materials of construction for airfoiled component 40 can be easily optimized using additive manufacturing processes and apparatus. In one example, airfoil section 44 can include at least one airfoil alloy composition, and damper 62 can include at least one damper alloy composition. In certain embodiments, at least one of the airfoil compositions can be substantially identical to the at least one damper alloy composition. This allows certain portions of both airfoil section 44 and damper 62 to be formed simultaneously in a layerwise manner, using a standard powder bed or other additive manufacturing apparatus.

Alternatively, the airfoil alloy composition(s) can be tailored to withstand high thermal and mechanical loads in the flowpath, while the alloy composition(s) of internal damper 62 are different from the damper alloy composition(s) to favor the mechanical properties of the damper over its thermal resistance. This can occur, for example, when damper pocket 58 forms at least a portion of a cooling cavity or other airfoil passage. Additive manufacturing also allows and simplifies the integration of a damper pocket and an airfoil cooling passage with reduced cooling losses due to a more secure internal connection of the damper, rather than using a damper which is insertable from the outside of the component.

In another example, the geometry of damper(s) 62 can be more carefully tailored to particular vibrational modes in different regions of the airfoil. For example, damper fixed end 64 can have larger thickness and/or chordwise dimensions as well as a stronger alloy composition to maintain secure bonding around the base of damper pocket 58. Toward free end 66, damper 62 can have dimensions, curvature, and alloy compositions tailored to the vibrational characteristics of airfoil section 46 disposed in the engine flowpath. Forming the damper via conventional techniques such as forging or powder metallurgy reduces the ability to design more flexible damper geometries and tailor alloy compositions for more complex airfoil designs which are also made possible via additive manufacturing.

FIGS. 3A and 3B show a single damper 62 and damper pocket 58. However, in certain embodiments, it will be appreciated that a plurality of dampers 62 can extend spanwise along damper pocket 58. In this case, each damper 62 can include fixed end 64 metallurgically bonded or unified with a surface of the damper pocket 58, with free ends 66 contacting other surfaces of pocket 58 in use of component 40. A substantial portion of each damper 62 can be built in a layerwise manner and unified with a damper mounting surface via an additive manufacturing process. Additionally or alternatively, airfoil section 44 can include multiple damper pockets 58 each with one or more dampers 62 unified to corresponding damper pocket mounting surface(s). In these and other embodiments, airfoil section 44, damper pocket(s) 58 and damper(s) 62 can have a unitary construction and a substantial portion of each can be fabricated using an additive manufacturing process. In certain embodiments with one or more dampers 62, damper pocket(s) 58 can be defined by surfaces including one or more of: suction sidewall 46, pressure sidewall 48, and internal rib(s) 75.

Figure 4:
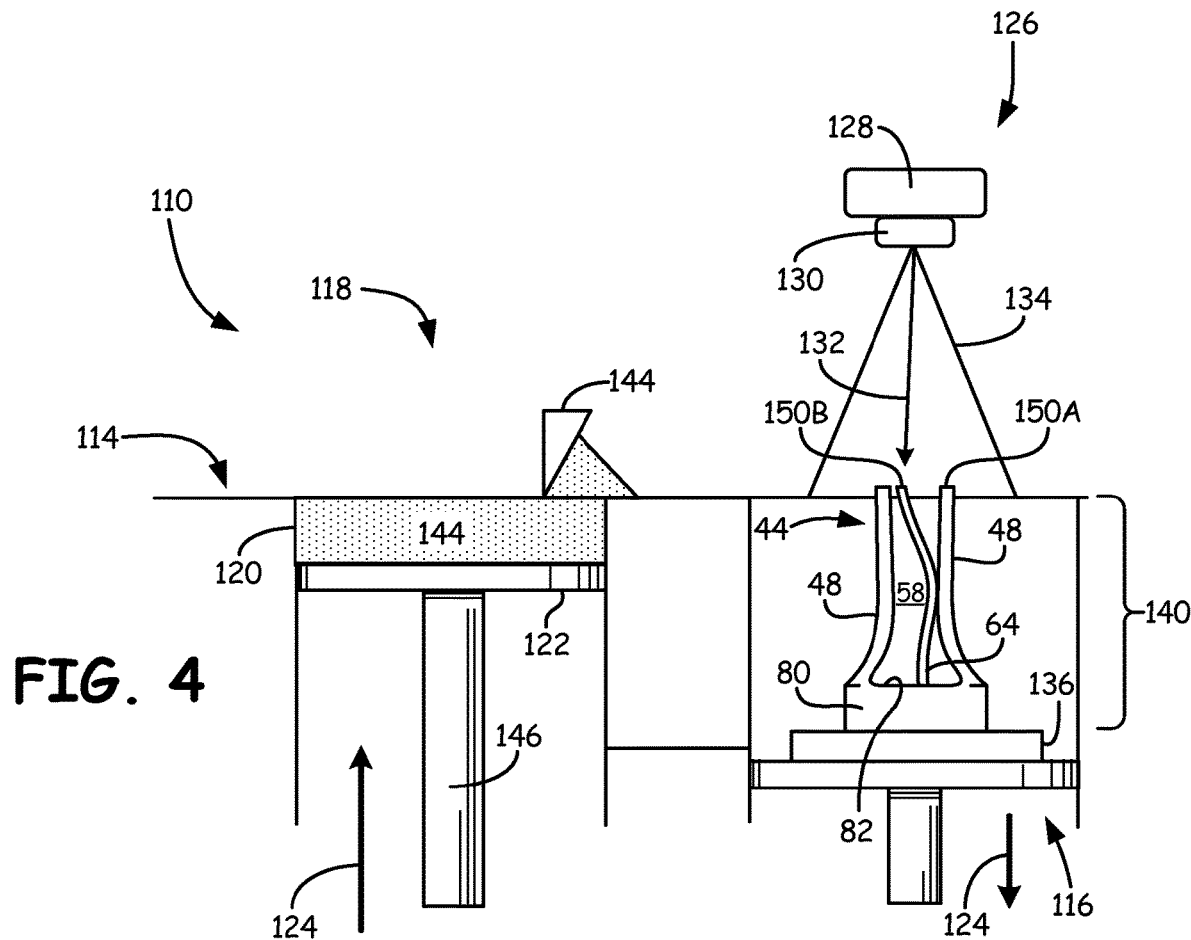
FIG. 4 shows the airfoiled component formed by an additive manufacturing apparatus.

FIG. 4 illustrates the making of a airfoiled component using an example additive manufacturing apparatus 110. Embodiments of apparatus 110 utilize various additive manufacturing processes such as but not limited to direct laser sintering (DLS) manufacturing, direct laser melting (DLM) manufacturing, selective laser sintering (SLS) manufacturing, selective laser melting (SLM) manufacturing, laser engineering net shaping (LENS) manufacturing, electron beam melting (EBM) manufacturing, direct metal deposition (DMD) manufacturing, and others known in the art.

Build table 114 includes movable build platform 116, which can be any object which is capable of being mounted to additive manufacturing apparatus 110 for building one or more near-net shape components. Powder delivery system 118 is capable of supplying successive quantities of metal powder to build platform 116. In this example, powder delivery system 118 includes powder compartment 120 with powder elevator platform 122 disposed proximate to, and movable opposite build platform 116. Build arrows 124 indicate that powder elevator platform 122 is movable in a first vertical direction, and build platform 116 is movable in a second vertical direction opposite the first vertical direction. However, it will be appreciated that other powder supply arrangements can be used such as those where the metal powder is injected into an energy beam before it reaches the intended deposition surface(s). This non-limiting example of energy beam apparatus 126 shows beam generator 128 and outlet lens 130 adapted to steer energy beam 132 generally along beam path 134 toward build platform 116. This example is simplified for brevity, and it will therefore be understood that other more complex electron or laser beam configurations (e.g., steering mirrors, prisms, and/or multi-axis CNC systems) can be incorporated to operate other embodiments of energy beam apparatus 126.

FIG. 4 also shows powder bed build plate 136 disposed on build platform 116 to serve as a substantial portion of an initial working surface for build assembly 140. A plurality of successively deposited powder build layers are provided from powder supply 142 by recoater 144 to build assembly 140. Each powder build layer converted into successively formed component build layers according to a computer model, which can be stored in an STL memory file or other electronic data file accessible by a controller (not shown) of additive manufacturing apparatus 110. Selective areas of each successive deposited layer can be sintered or otherwise adhered to the preceding layer by energy beam 132. After each successive layer, recoater 144 is returned to a starting position near elevator platform 122, while supply piston 146 advances upward to expose another layer from powder supply 142, while build platform 116 indexes down by approximately one layer thickness. The process is repeated until build assembly 140 is complete with one or more near-net shape airfoiled components 40 built in a layerwise manner. FIG. 4 shows only one non-limiting example of a powder bed type additive manufacturing process and apparatus, and is not meant to limit the described subject matter to a single process or machine.

In FIG. 4, component base 80 is removably secured to build plate 136. In one example, base 80 can be a precursor to a component root section (e.g., root section 42) of a rotor blade, stator vane, or other airfoiled component. In certain embodiments, base 80 is formed for example via a combination of forging, casting, machining, or other conventional metallurgical processes. Alternatively, base 80 can be started from scratch and built in a layerwise fashion by additive manufacturing apparatus 110 before being used as the foundation for the rest of the component (e.g., airfoil section 44 and damper 62). In yet other alternative embodiments, airfoil section 44 and damper 62 are built first on a sacrificial surface by additive manufacturing apparatus 110, and subsequently, base 80 can be metallurgically bonded to completed airfoil section 44.

In FIG. 4, both airfoil walls 46, 48 and damper(s) 62 can be built up in a layerwise fashion. Portions of airfoil section 44 are omitted to better show damper pocket 58 and damper 62. Each component wall build layer can be formed by providing a first quantity of metal powder to a first deposition surface. At least a portion of this first quantity of metal powder can then be selectively melted into a molten pool (not shown), for example, by selectively steering energy beam 132 thereover. At least a portion of the first molten pool can then be solidified into a subsequent component wall build layer 150A adhered to a preceding component wall build layer, or other structure serving as a first deposition surface. Iteratively performing these steps result in formation of one or more substantially complete component or airfoil sidewalls comprising a plurality of successive component wall build layers.

Along with formation of each component wall build layer, each damper build layer can be formed by providing a second quantity of metal powder to a second deposition surface. The second deposition surface may be disposed inward of the first deposition surface. Energy beam 132 can be selectively scanned over the second plurality of dispensed metal powder particles to form a second molten powder pool (not shown). At least a portion of the second molten pool can then be solidified into a subsequent damper wall build layer 150B adhered to a preceding damper wall build layer or other structure serving as the second deposition surface. Iteratively performing these steps result in formation of one or more substantially complete dampers unified with a damper pocket mounting surface. The damper(s) can include a plurality of successive damper build layers.

Generally, each successive iteration of the first and second deposition surface(s) comprise at least a portion of a preceding build layer 150A, 150B. There may be some overhang and discontinuities, depending on the final build requirements and the capabilities of the build apparatus.

The first and second deposition surfaces can also be contiguous portions of the same surface, for example when forming the initial build layers on base deposition surface 82, and/or when forming a temporary damper connection between damper free end 66 and damper pocket 58 (see, e.g., damper connection 77 in FIG. 3B). The initial damper wall build layer can thus be adhered to and unified with the second portion of base deposition surface 82. In certain embodiments, damper pocket 58 may extend into base 80.

Additive manufacturing of both airfoil portion 44 and damper 62 allows unification of damper 62 and a mounting surface of damper pocket 58. This makes the connection of damper 62 more secure and robust, which reduces the need to repair or replace damper 62 before the end of the useful life of component 40. Additive manufacturing also allows for controlled deposition of one or more alloy transitional regions to accommodate varying alloy compositions used throughout airfoiled component 40.

In certain embodiments, build layers are stacked generally in a spanwise direction. However, it will be appreciated that in certain embodiments such as those with an internal cooling configuration and/or multiple damper cavities, the surfaces of damper cavity 58 can comprise one or more of: a suction sidewall, a pressure sidewall, and an internal rib.

In certain embodiments, both first and second powder layers can be provided to the respective deposition surfaces before solidifying either of them into a build layer. Alternatively, some or all of the damper can be built up in a layerwise fashion prior to the component walls (e.g., airfoil sidewalls and/or optional ribs) being built up therearound. Similarly, the component walls can be built first with the damper(s) to follow. This may be done with multiple, relatively small damper pockets where it is relatively easy to remove excess powder prior to enclosing each damper pocket. With larger dampers, a LPD or LENS type machine or similar machine can be used in which the powder is injected directly into the energy beam, rather than being supplied using a powder bed type system.

Figure 5:
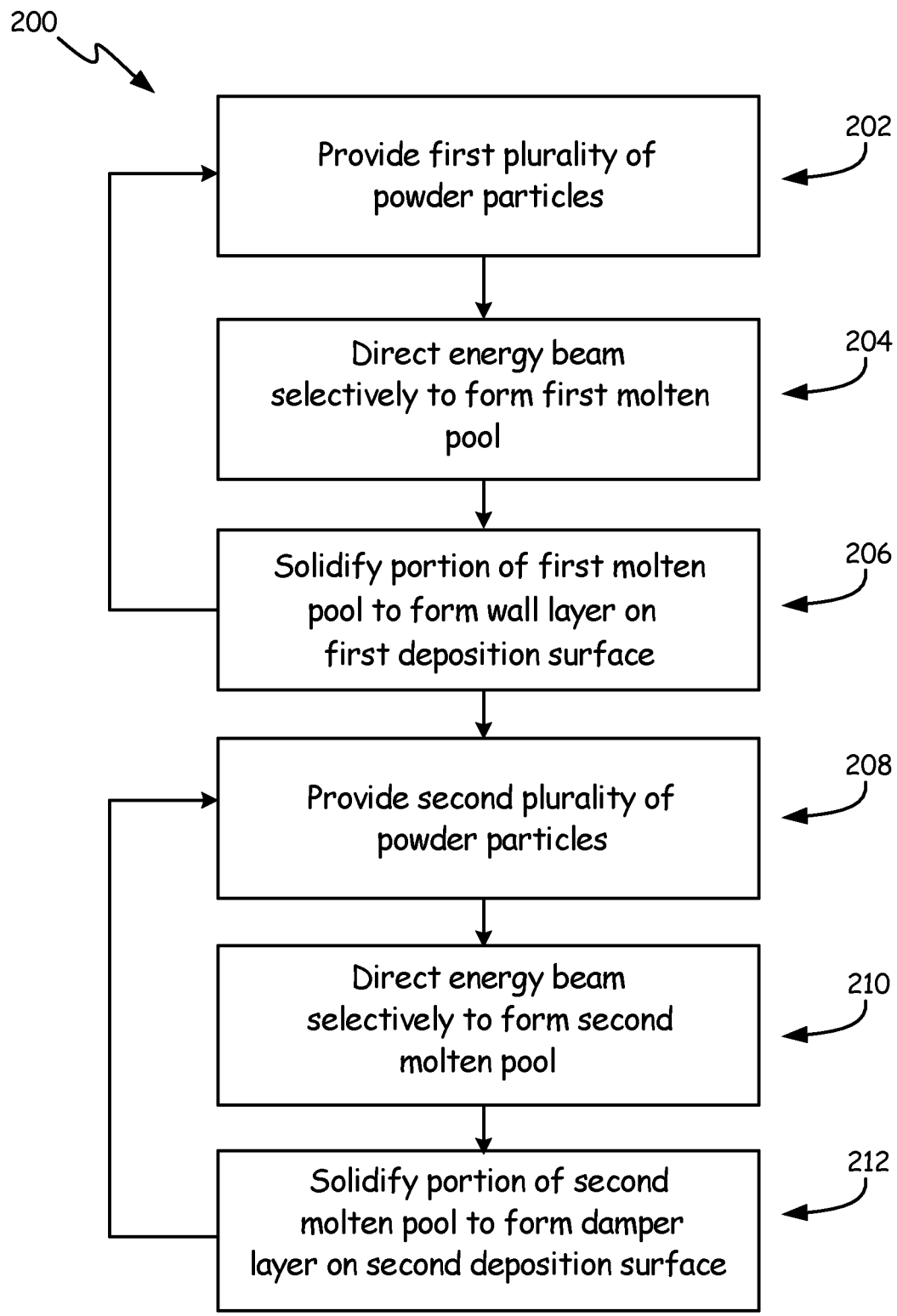
FIG. 5 is a chart listing steps of a method for forming an airfoiled component.

FIG. 5 summarizes example steps of forming a airfoiled component. Steps 202 to 206 relate to layerwise forming of a component wall such as airfoil sidewalls 46, 48 (shown in FIG. 4). Steps 208 to 212 relate to forming a damper such as damper 62 (also shown in FIG. 4).

In step 202, shown in FIG. 5, a first plurality of metal powder particles are provided. Step 204 includes directing an energy beam selectively over the first plurality of metal powder particles to form a first molten powder pool. This can be done, for example, using a powder bed deposition apparatus wherein the first plurality of metal powder particles are provided to a surface prior to directing the energy beam. Alternatively, the metal powder particles are directly injected into the beam to form the molten pool. At step 206, at least a portion of the first molten powder pool is solidified to form a component wall build layer on a first deposition surface such as a preceding component wall build layer 152 or base deposition surface 82 (shown in FIG. 4).

Step 208 includes providing a second plurality of metal powder particles. At step 210, an energy beam is selectively directed over the second plurality of metal powder particles to form a second molten powder pool. Similar to the formation of the first molten pool in steps 202 and 204, this can be done with either a powder bed deposition apparatus or by injecting the powder directly into an energy beam. In step 212 at least a portion of the second molten powder pool can be solidified to form a damper build layer on a second deposition surface.

Various steps of method 200 can be iteratively performed to make a plurality of airfoiled components such as those shown and described with respect to FIGS. 1-4. After these steps each damper can then be enclosed within a damper pocket. In certain embodiments, enclosing the damper includes layerwise forming a tip or other portion of the airfoil onto a substantially contiguous layer of the airfoil wall. To prevent complications due to excessive overhang, the walls may be tapered or angled in such a way that each layer of powder and the resulting pool can adhere to the previous deposition surface until solidification. Alternatively, a separately formed tip portion (e.g., casting, forging, and/or machining) can be metallurgically bonded to a final substantially contiguous layer of the article/airfoil wall.

Discussion of Possible Embodiments

The following are non-exclusive descriptions of possible embodiments of the present invention:

An airfoiled component comprises: a root section, an airfoil section, a damper pocket enclosed within a portion of the airfoil section, and a damper. The airfoil section includes a suction sidewall and a pressure sidewall each extending chordwise between a leading edge and a trailing edge, and extending spanwise between the root section and an airfoil tip. The damper includes a fixed end unified with a damper mounting surface, and a free end extending into the damper pocket from the damper mounting surface.

The apparatus of the preceding paragraph can optionally include, additionally and/or alternatively, any one or more of the following features, configurations and/or additional components:

A further embodiment of the foregoing airfoiled component, wherein the fixed end of the damper is unified with the damper mounting surface using an additive manufacturing process.

A further embodiment of any of the foregoing airfoiled components, wherein the airfoil section comprises a plurality of stacked component wall build layers forming the suction sidewall and the pressure sidewall.

A further embodiment of any of the foregoing airfoiled components, wherein the damper comprises a plurality of stacked damper build layers forming the fixed end and the free end.

A further embodiment of any of the foregoing airfoiled components, wherein the airfoil section includes a first airfoil alloy composition, and the damper includes a first damper alloy composition.

A further embodiment of any of the foregoing airfoiled components, wherein the first airfoil alloy composition is substantially different from the first damper alloy composition.

A further embodiment of any of the foregoing airfoiled components, wherein the damper also includes a second damper alloy composition having a strength greater than a strength of the first damper alloy composition.

A further embodiment of any of the foregoing airfoiled components, wherein the fixed end of the damper is formed using the second damper alloy composition, and the free end of the damper is formed using the first damper alloy composition.

A further embodiment of any of the foregoing airfoiled components, wherein the damper pocket comprises a portion of an airfoil cooling cavity.

A further embodiment of any of the foregoing airfoiled components, further comprising: a temporary damper connection between the free end of the damper and a damper pocket surface.

A further embodiment of any of the foregoing airfoiled components, further comprising a plurality of dampers, each damper including a fixed end unified with a corresponding damper mounting surface, and a free end extending into the damper pocket from the damper mounting surface.

A further embodiment of any of the foregoing airfoiled components, further comprising a plurality of damper pockets enclosed within a portion of the airfoil section, each of the damper pockets including a damper mounting surface.

A method of making an airfoiled component for a turbine engine comprises (a) providing a first plurality of metal powder particles. (b) An energy beam is selectively directed over the first plurality of metal powder particles to form a first molten powder pool. (c) At least a portion of the first molten powder pool is solidified to form a component wall build layer on a first deposition surface. (d) A second plurality of metal powder particles is provided. (e) An energy beam is directed selectively over the second plurality of metal powder particles to form a second molten powder pool. (f) At least a portion of the second molten powder pool to form a damper build layer on a second deposition surface.

The method of the preceding paragraph can optionally include, additionally and/or alternatively, any one or more of the following steps, features, configurations and/or additional components:

A further embodiment of the foregoing method, wherein a first iteration of step (a) and a first iteration of step (d) are both performed prior to a first iteration of any of steps (b), (c), (e) and (f).

A further embodiment of any of the foregoing methods, wherein a first iteration of steps (b), (c), (e) and (f) are each performed subsequent to either a second iteration of step (a) or a second iteration of step (d).

A further embodiment of any of the foregoing methods, wherein a first iteration of steps (a)-(c) and a second iteration of steps (a)-(c) are performed prior to a first iteration of steps (d)-(f).

A further embodiment of any of the foregoing methods, further comprising iteratively performing steps (a)-(c) to form an airfoil section comprising a plurality of successive component wall build layers, each of the plurality of successive component wall build layers formed on a corresponding plurality of successive first deposition surfaces.

A further embodiment of any of the foregoing methods, wherein each successive first deposition surface comprises at least a portion of a preceding component wall build layer.

A further embodiment of any of the foregoing methods, wherein the airfoil section includes at least one component wall bounding a damper pocket, the damper pocket having a damper mounting surface.

A further embodiment of any of the foregoing methods, further comprising: iteratively performing steps (d)-(f) to form at least one damper unified with the damper mounting surface, the damper comprising a plurality of successive damper build layers; wherein each of the plurality of successive damper build layers is formed on a corresponding plurality of successive second deposition surfaces.

A further embodiment of any of the foregoing methods, wherein each successive first deposition surface comprises at least a portion of a preceding component wall build layer.

A further embodiment of any of the foregoing methods, further comprising forming a temporary damper connection between a free end of the at least one damper and a damper pocket surface spaced apart from the damper mounting surface.

A further embodiment of any of the foregoing methods, further comprising enclosing the at least one damper within the damper pocket.

A further embodiment of any of the foregoing methods, wherein the enclosing step comprises layerwise forming a tip portion of the airfoil section.

A further embodiment of any of the foregoing methods, wherein the enclosing step comprises metallurgically bonding a separately formed tip portion to the airfoil section.

A further embodiment of any of the foregoing methods, wherein the damper pocket is bounded by: a suction sidewall, a pressure sidewall, and/or an internal rib.

A further embodiment of any of the foregoing methods, wherein the damper pocket comprises at least a portion of an airfoil cooling passage.

A further embodiment of any of the foregoing methods, wherein the first metal powder comprises a first airfoil alloy composition, and the second metal powder comprises a first damper alloy composition.

A further embodiment of any of the foregoing methods, wherein the first airfoil alloy composition is substantially different from the first damper alloy composition.

A further embodiment of any of the foregoing methods, wherein steps (a)-(f) are performed using an additive apparatus selected from a group consisting of: a direct laser sintering (DLS) apparatus, a direct laser melting (DLM) apparatus, a selective laser sintering (SLS) apparatus, a selective laser melting (SLM) apparatus, a laser engineering net shaping (LENS) apparatus, an electron beam melting (EBM) apparatus, and a direct metal deposition (DMD) apparatus.

Although the present invention has been described with reference to preferred embodiments, workers skilled in the art will recognize that changes may be made in form and detail without departing from the spirit and scope of the invention.

The invention claimed is:

1. An airfoiled component for a turbine engine, the component comprising:
    a root section;
    an airfoil section including a suction sidewall and a pressure sidewall each extending chordwise between a leading edge and a trailing edge, and extending spanwise between the root section and an airfoil tip;
    a damper pocket enclosed within a portion of the airfoil section, the damper pocket including a damper mounting surface;
    a damper including a fixed end unified with the damper mounting surface, and a free end extending into the damper pocket from the damper mounting surface; and
    a temporary damper connection between the free end of the damper and a damper pocket surface, the temporary damper connection comprising a honeycomb structure attaching the free end of the damper to the damper pocket surface.

2. The airfoiled component of claim 1, wherein the fixed end of the damper is unified with the damper mounting surface using an additive manufacturing process.

3. The airfoiled component of claim 1, wherein the airfoil section comprises:
    a plurality of stacked component wall build layers forming the suction sidewall and the pressure sidewall.

4. The airfoiled component of claim 3, wherein the damper comprises:
    a plurality of stacked damper build layers forming the fixed end and the free end.

5. The airfoiled component of claim 1, wherein the airfoil section includes a first airfoil alloy composition, and the damper includes a first damper alloy composition.

6. The airfoiled component of claim 5, wherein the first airfoil alloy composition is different from the first damper alloy composition.

7. The airfoiled component of claim 5, wherein the damper also includes a second damper alloy composition having a strength greater than a strength of the first damper alloy composition.

8. The airfoiled component of claim 7, wherein the fixed end of the damper is formed using the second damper alloy composition, and the free end of the damper is formed using the first damper alloy composition.

9. The airfoiled component of claim 1, wherein the damper pocket comprises a portion of an airfoil cooling cavity.

* * * * *